Patented July 27, 1943

2,325,331

UNITED STATES PATENT OFFICE 2,325,331

AMINO-ACID AMIDE DERIVATIVES AND A PROCESS FOR THEIR MANUFACTURE

Henry Martin and Walter Stammbach, Basel, Switzerland, assignors to the firm J. R. Geigy S. A., Basel, Switzerland No Drawing. Application February 1, 1938, Serial No. 188,203. In Germany February 5, 1937

9 Claims. (Cl. 260—562)

This invention relates to an improvement in or modification of the subject matter of the U. S. patent applications Ser. No. 115,440 and Ser. No. 115,441, both filed December 11, 1936, which disclose processes for making new amino fatty acid derivatives by causing a compound of the type

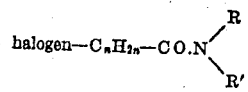

($n=1, 2, 3$), having halogen capable of easy exchange to react with certain amines.

In the aforesaid patent application Ser. No. 115,440 the amines concerned are primary, secondary or tertiary amines of aliphatic, araliphatic hydroaromatic or aromatic nature which, when they are secondary or tertiary amines, may contain the same or different substituents and, if alkyl radicals are present, may contain hydroxyl or halogen or both. So far as secondary or tertiary bases are produced, these may be further treated with the usual non-substituted or halogen-substituted or hydroxyl-substituted or both halogen- and hydroxyl-substituted, alkylating or aralkylating agents. In this case R in the general formula is a saturated or unsaturated alkyl radical of high molecular weight comprising more than six carbon atoms and R' is a cycloalkyl, aralkyl or aryl group.

In the aforesaid patent application Ser. No. 115,441, the meaning to be attached to R and R' differs from that attached to these symbols in the aforesaid patent application Ser. No. 115,440. In the aforesaid patent application Ser. No. 115,-441 R means hydrogen, an alkyl group having less than 6 carbon atoms, aralkyl or aryl, and R' means alkyl with less than 6 carbon atoms, cycloalkyl, aralkyl or aryl. In this case, however, the choice of the amine reacting with the active halogen or the agent for after-treatment must be so selected that a saturated or unsaturated radical of high molecular weight having more than 6 carbon atoms is present in the new compound or is introduced thereinto.

The present invention relates to an improvement in or modification of that described in the aforesaid U. S. patent applications Ser. No. 115,440 and Ser. No. 115,441 and affords new compounds of valuable properties by causing a halogen fatty acid amide of the type.

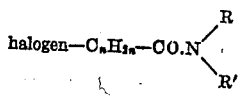

$n=1, 2, 3$), having halogen capable of easy exchange and in which R is an aryl radical of high molecular weight with at least 10 carbon atoms which may or may not contain substituents and R' is hydrogen, alkyl or aralkyl, to react on one of the nitrogen compounds specified in the aforesaid patent applications Ser. No. 115,440 or Ser. No. 115,441. Equally suitable for the invention are ammonia or primary, secondary or tertiary aliphatic, aliphatic-araliphatic, aliphatic-hydroaromatic, aliphatic-aromatic, hydroaromatic, aromatic or cyclic amines. These may contain the same or different substituents which may themselves contain further substituents, particularly alkyl radicals may contain OH or halogen or both as substituents. In so far as primary, secondary or tertiary bases are produced, these may be further treated with the usual non-substituted or halogen- or hydroxyl-substituted or both halogen- and hydroxyl-substituted saturated or unsaturated alkylating or aralkylating agents. The new amino fatty acid amides thus produced may also be converted into salts of organic or inorganic acids.

The halogen fatty acid amides used as parent materials are made by the action of a halogen fatty acid or a suitable derivative thereof, for instance the ester or chloride, to act upon a secondary amine of the type

in which R is an aryl radical of high molecular weight containing at least 10 carbon atoms which may or may not contain substituents and R' is hydrogen, alkyl or aralkyl. Examples are as follows: benzoyl-para-phenylenediamine, nicotoyl-para-phenylenediamine, 4-aminodiphenyl, 4:4'-diaminodiphenyl, 4:4'-diaminostilbene, 4:4'-diaminodiphenylsulphide, 4:4'-diaminodiphenylurea, 4:4'-diaminomaleic acid dianilide, 4-amino-2':4'-dichlorodiphenyl ether or the like.

When diamines are caused to react there may be used one or two molecular proportions of halogen fatty acid or its derivative. The reaction of the halogen fatty acid amides thus obtained with the amines defined above may follow known methods in which primary up to quaternary amino fatty acid amides are produced with the aid of ammonia or primary, secondary or tertiary amines with the elimination of hydrogen halide. If the amine used for the reaction is so selected that a primary, secondary or tertiary amino fatty acid amide is produced, this may be subsequently alkylated to produce up to quaternary substitution. This happens with the usual alkylating agents, for instance with mineral acid esters of saturated or unsaturated alcohols, for instance alkyl, aralkyl or alkylene halides, halogen hydrins, dialkyl sulphates or the like or by addition of sulphonic acid esters.

The new nitrogen compounds are insoluble in water when they are in the form of free bases with the exception of the quarternary compounds. They may be rendered soluble in water by any of the methods commonly used for this purpose in connection with ammonia derivatives. With inorganic or organic acids there are produced salts, for instance hydrochlorides, sulphates, phosphates, silicofluorides, formates, chloracetates, oxalates, citrates, tartrates or the like.

The new amino fatty acid derivatives may be used for various purposes. By suitable choice of the components used in their production they may unite in the same molecule certain properties or they may produce a specific effect. The properties of the final material may be widely influenced by taking advantage of the fact that into the amide radical of the halogen fatty acid amide there may be introduced in addition to an aryl radical of high molecular weight a further radical of the alkyl or aralkyl series, which is accessible to very various substitution. By suitable substitution the substantive character and the poisonous effect on the larvae of insects exhibited by the product may be profoundly varied. There may be obtained for example textile assistants such as agents for protecting wool, furs, feathers and the like from moths and other wool pests. Owing to their pronounced fastness to fulling, the new water soluble amino fatty acid derivatives are highly useful products superior to others proposed for like uses.

By further substitution or suitable reaction with acids or after-treatment with alkylating agents there may be produced materials useful in combatting animal pests, for example compounds for protecting plants, also valuable fungicides and bactericides.

The following examples illustrate the invention, the parts being by weight:

*Example 1*

84.5 parts of 4-aminodiphenyl are dissolved in 1000 parts of benzene at 70–80° C. and into the solution are gradually dropped while stirring at about 75° C. 67 parts of chloracetyl chloride. After 24 hours the evolution of hydrogen chloride will have ceased. The mass is then allowed to cool, the chloracetyl-4-aminodiphenyl is filtered with suction and then introduced into 500 parts of an aqueous solution of 10 per cent strength of dimethylamine. After 48 hours a sample of the product of reaction should dissolve clearly in hydrochloric acid. The suspension is mixed with 500 parts of water and the dimethylamino-aceto-4-aminodiphenyl is filtered with suction.

It may be converted into salts by decomposition with organic or inorganic acids, for example hydrochloric, sulphuric, phosphoric, silicofluoric, formic, chloracetic, oxalic, citric and tartric acid. The dimethylamino-aceto-4-aminodiphenyl may also be onverted into quaternary compounds.

25 parts of the dried dimethylamino-aceto-4-aminodiphenyl are dissolved in 200 parts of benzene and the solution is stirred at 70–85° C. for 48 hours with 15 parts of benzyl chloride. After cooling, the ammonium compound is filtered, washed with benzene and dried. This product is clearly soluble in water.

Instead of benzylchloride there may also be used o- or dichlorobenzylchloride, toluene sulphonic acid alkylesters, chloromethylenesalicylic acid, dimethyl- and diethyl-sulphates and so on.

Instead of dimethylamine in the above example there may also be used ammonia or other primary or secondary amines, such as diamylamine, piperidine, monomethyl-, ethyl-, butyl-, amyl-, benzyl-, ethanolamine, γ-chloro-β-hydroxy- and β,γ-dihydroxy-propylamine or the corresponding phenylamines, cyclohexylamine, ethylenediamine and asym. diethylethylenediamine, diethyl-, diethanol-amine and so on. If hydrogen atoms are present in the aminoacylamide, they may be replaced by other groups according to the usual methods of alkylation or aralkylation.

*Example 2*

92 parts of benzidine are dissolved in 1400 parts of benzene and there are added gradually at 70–80° C. and while stirring vigorously 135 parts of chloroacetyl chloride. After 24 hours the evolution of hydrochloric acid will have ceased, the mass is allowed to cool and the sparingly soluble dichloracetyl derivative which has separated is filtered with suction and dried. It is then introduced into 500 parts of an aqueous solution of 20 per cent strength of dimethylamine, which has been diluted with 750 parts of water, and the whole is stirred cold during 56 hours, until a sample is clearly soluble in hydrochloric acid. There are then added 500 parts of water and the tertiary base is filtered with suction, washed with water and dried. 35.4 parts of this di-(dimethylamino-aceto)-4:4'-diaminodiphenyl are dissolved in 200 parts of benzene and this solution, while stirring well, is mixed and boiled with 30 parts of benzyl chloride during 40 hours. After cooling, the mixture is filtered with suction, the solid matter is washed with benzene. When dry this quaternary compound is clearly soluble in water.

All the variations mentioned in Example 1 may also be applied for Example 2.

*Example 3*

30 parts of

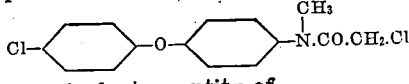

or the equivalent quantity of

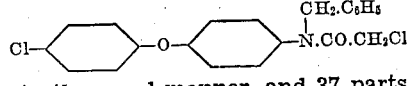

made in the usual manner, and 37 parts of trimethylamine in an alcoholic solution of 33 per cent strength are heated together with 200 parts of ethyl alcohol for 5 hours in an autoclave at 130–140° C. The alcohol and the excess of trimethylamine are then distilled off and the residue is dried for a short time in a vacuum. There is obtained a white powder which is clearly soluble in water.

Other tertiary bases may be used instead of trimethylamine, for example triethyl-, triamyl-, triethanolamine, pyridine bases, nicotine and so on.

Instead of chloracetylchloride in the above examples there may also be used other halogenides, such as the bromides, or α-halogenopropionic or -butyric acid chlorides.

Instead of the high molecular aromatic amines of the Examples 1 to 3 there may also be used the following: 4:4'-diamino-diphenylurea, diaminodiphenylsulphide, 4'-chloro-4-aminodiphenylsulphide, 4:4'-dichloro-2-aminodiphenylsulphide, 2':4-dichloro-2-aminodiphenylsulphide, 3':4'-dichloro-4-aminodiphenylsulphide, 2:3'-dichloro-4-aminodiphenylsulphide, 4'-chlorobenzyl-4-chloro-2-aminophenylsulphide, 4:4'-diamino-3:3'-dimethyl- or dimethoxy- or dichlorodiphenyl, 5:8-dichloro-1-naphthylamine, 4'-amyl-4-aminodiphenyl ether, 4'-chloro-3'-methyl-4-aminodiphenyl ether, 3':5'-dimethyl-2-chloro-4-aminodiphenyl ether, 3':5'-dimethyl-4'-chloro-4-aminodiphenyl ether, 4'-chloro-2'-aceto-4-amino-diphenyl ether, 2':4'-dichloro-4-aminodiphenyl ether, 4'-methyl-2:2'-dichloro-4-aminodiphenyl ether, 4'-amyl-2':4-dichloro-2-aminodiphenyl ether, 3':4'-dichloro-4-aminodiphenyl ether, 3:4'-dichloro-3-methyl-2-aminodiphenyl ether, 4:4'-dichloro-2-aminodiphenyl ether, 2':4:4'-trichloro-6'-methyl-2-aminodiphenyl ether, 3:4:4'-trichloro-2-aminodiphenyl ether, 2:3':4'-trichloro-4-aminodiphenyl ether, 3':4:4'-trichloro-2-aminodiphenyl ether, 3:3':4'-trichloro-2-aminodiphenyl ether, 2':4'-dichloro-6'-methyl-2:4-diaminodiphenyl ether, 2:4-di-(4'-chlorophenoxy)-1-aminobenzene, 4'-chloro-4-amino-diphenylsulphone, 3':4'-dichloro-4-amino-diphenylsulphone, 4:4'-diaminodiphenylsulphone, 4'-chloro-4-aminodiphenylsulphoxide, 4:4'-diaminobenzophenone, 4'-chloro-4'-aminobenzophenone,

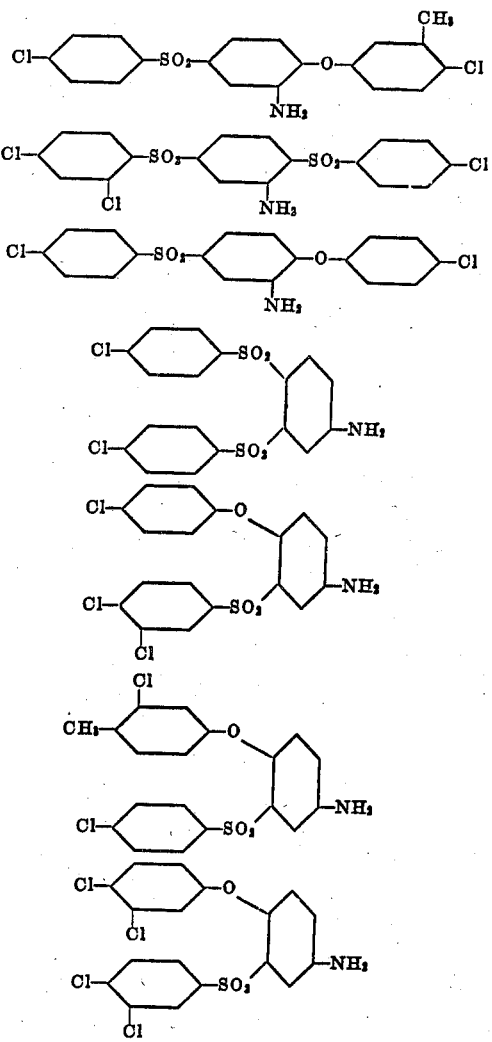

and so on.

What we claim is:

1. A process for the preparation of amino-acid amide derivatives which comprises subjecting n molecular proportions of an amine selected from the group consisting of primary, secondary and tertiary amines of the aliphatic, araliphatic, hydroaromatic and benzene series in an aqueous medium to the action of a compound which contains easily exchangeable halogen and which corresponds to the formula

[halogen—CH$_2$—CO—NH]$_n$—X in which X represents an aromatic radical of the benzene series containing at least two benzene rings, n representing an integer selected from the group consisting of 1 and 2, and maintaining said amine and compound in intimate contact with each other in said medium until the halogen of said compound has been replaced by the radical of the said amine.

2. A process for the preparation of amino-acid amide derivatives which comprises subjecting two molecular proportions of an amine selected from the group consisting of primary, secondary and tertiary amines of the aliphatic, araliphatic, hydroaromatic and benzene series in an aqueous medium to the action of a compound which contains easily exchangeable halogen and which corresponds to the formula

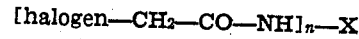

in which X represents an aromatic radical of the benzene series containing at least two benzene rings, and maintaining said amine and compound in intimate contact with each other in said medium until the halogen of said compound has been replaced by the radical of the said amine.

3. A process of the character described which comprises subjecting dimethylamine in aqueous medium to the action of

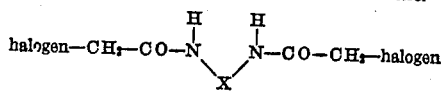

and maintaining these compounds in intimate contact with each other in said medium until the Cl of the Cl.CH$_2$.CO.NH-radical of the second-named compounds is replaced by the radical of the dimethylamine, and then converting the resultant aminoacetamide derivative into the quaternary compound of the formula

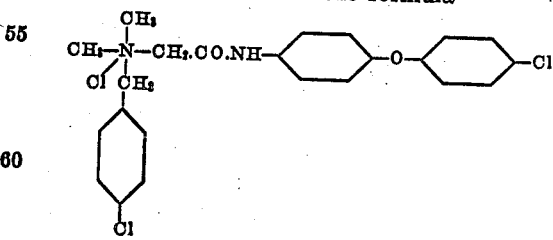

by maintaining said aminoacetamide derivative in intimate contact in hydrocarbon solvent in the heat with 4-chlorobenzylchloride until the latter has added on.

4. A process of the character described which comprises subjecting dimethylamine in aqueous medium to the action of

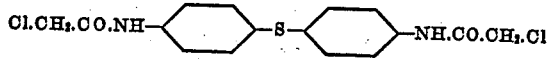

and maintaining these compounds in intimate contact with each other in said medium until the Cl of the Cl.CH₂.CO.NH-radicals of the second-named compound are replaced by dimethylamine radicals, and then converting the resultant aminoacetamide derivative into the quaternary compound of the formula

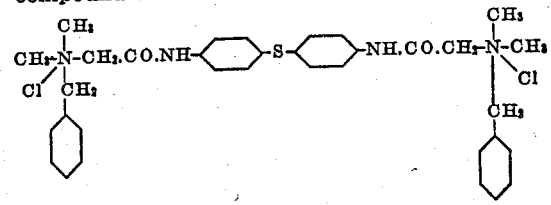

by maintaining said aminoacetamide derivative in intimate contact in hydrocarbon solvent in the heat with benzylchloride until the latter has added on.

5. A process of the character described which comprises subjecting dimethylamine in aqueous medium to the action of

and maintaining these compounds in intimate contact with each other in said medium until the Cl of the Cl.CH₂.CO.NH-radicals of the second-named compound are replaced by dimethylamine radicals, and then converting the resultant aminoacetamide derivative into the quaternary compound of the formula

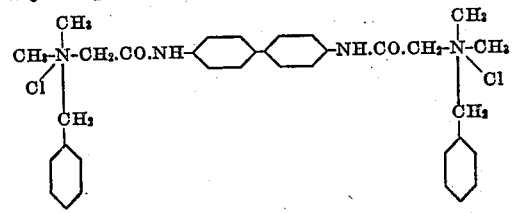

6. The amino-acid amides of the formula

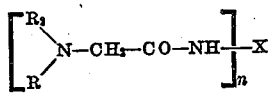

wherein $n$ represents an integer selected from the group consisting of 1 and 2, and X represents a radical selected from the group consisting of monovalent and divalent radicals containing at least two benzene rings, R₂ represents a member of the group consisting of hydrogen and aliphatic, araliphatic, hydroaromatic and aromatic radicals, and R₃ represents a member of the group consisting of aliphatic, araliphatic, hydroaromatic and aromatic radicals, and the salts and quaternary ammonium compounds of the said amino-acid amides.

7. The compound of the formula

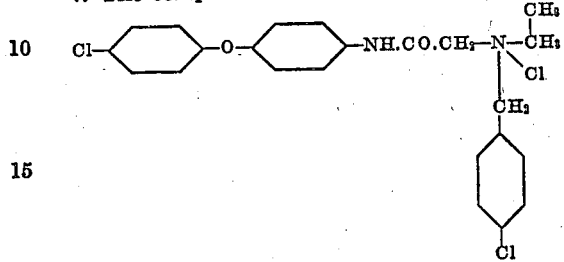

which is a colorless substance, soluble in water and capable of mothproofing wool textiles when applied thereto.

8. The compound of the formula

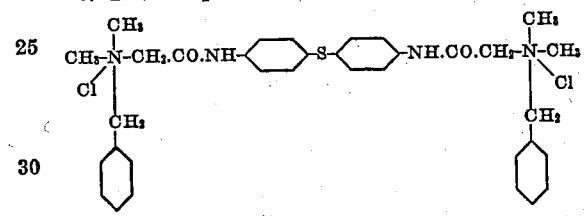

which is a colorless substance, soluble in water and capable of mothproofing wool textiles when applied thereto.

9. The compound of the formula

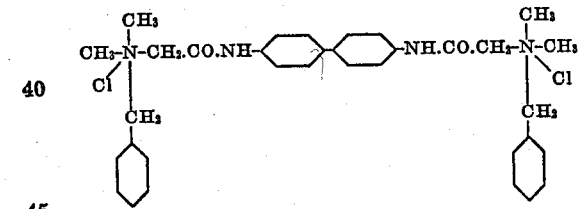

which is a colorless substance, soluble in water and capable of mothproofing wool textiles when applied thereto.

HENRY MARTIN.
WALTER STAMMBACH.